3,310,551
AZOSTILBENE DYESTUFFS
John H. McLeod, Tonawanda, N.Y., assignor to Allied Chemical Corporation, New York, N.Y., a corporation of New York
No Drawing. Filed Apr. 29, 1963, Ser. No. 276,178
11 Claims. (Cl. 260—157)

This invention relates to novel monoazo dyestuffs of the stilbene series, and more particularly to bis(naphthotriazo)stilbene dyestuffs.

The novel dyestuffs of the present invention have the following general formula

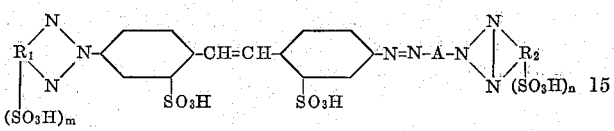

wherein $R_1$ and $R_2$ are 1,2-naphthylene radicals, A is an unsulfonated radical of the benzene series, the nitrogens attached to A being in para-position to each other, $n$ and $m$ are integers selected from the group 1 and 2, at least one of $n$ and $m$ being 2.

Unions of cotton and nylon 66 (polyhexamethyleneadipamide) are frequently dyed with two dyestuffs, one being a direct dye for the cotton, the other a dye for the nylon. In dyeing according to this procedure, the cotton dye should advantageously produce little or no stain on the nylon. However, most of the known dyestuffs which produce on cotton dyeings of a commercially desirable bright yellow shade have a high affinity for nylon fiber. For example, the monoazo stilbene dye of U.S. Patent 2,232,078, Example 3, represented by the formula

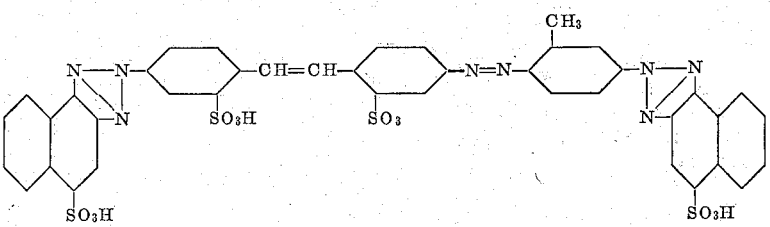

gives excellent yellow dyeings of cotton but stains nylon fiber heavily and, hence, is unsuitable in many instances for dyeing union fabrics of cotton and nylon.

The novel dyestuffs of the present invention on the other hand, give strong dyeings of cotton and other cellulosic fibers but do not appreciably stain nylon.

It is the principal object of the present invention to provide a novel class of dyestuffs of the above general formula having a high substantivity for cotton and which do not stain nylon to an appreciable extent.

This and other objects and advantages will be apparent from the following description of my invention.

The novel class of dyestuffs of this invention is represented by the general formula:

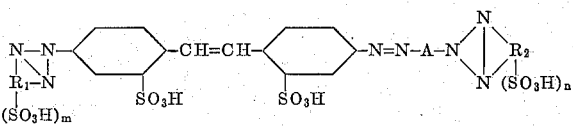

wherein $R_1$ and $R_2$ are 1,2-naphthylene radicals, A is a radical of the benzene series devoid of sulfonic acid groups, the nitrogens attached to A being in para-position to each other, $n$ and $m$ are integers selected from the group 1 and 2, at least one of $n$ and $m$ being 2.

The 1,2-naphthylene radicals, $R_1$ and $R_2$ and the benzene radical A may contain one or more non-chromophoric substituents. Such non-chromophoric substituents include hydrogen, lower hydrocarbon alkyl (e.g., methyl, ethyl), lower hydrocarbon alkoxy (e.g., methoxy, ethoxy, butoxy) and halogen.

The novel dyestuffs are suitable for use as colorants for cotton and other cellulosic fibers. They generally yield pure, yellow shades of excellent fastness to light and to washing. They are particularly distinguished by being substantially non-staining on superpolyamide fibers ("nylon").

Those dyestuffs of this novel class in which the two naphthotriazole nuclei together contain a total of three sulfonic acid groups are preferred in view of their superior characteristics in dyeing cotton.

Preferably the radical A in the above general formula has the structure

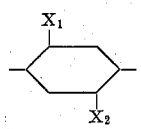

wherein $X_1$ is a lower alkyl group, $X_2$ is a member of the group consisting of hydrogen, lower alkyl and lower alkoxy.

The novel compounds of this invention afford strong yellow dyeings of cotton and other cellulosic fibers but surprisingly have substantially no affinity for nylon.

These new dyestuffs can be prepared in the following manner:

The sodium salt of 4-nitro-4'-aminostilbene-2,2'-disulfonic acid is diazotized in conventional manner and coupled into a 1- or 2-aminonaphthalene sulfonic acid capable of coupling in the ortho position to the amino group. The resulting o-aminoazo compound is treated with an oxidizing agent, e.g., sodium hypochlorite, copper salts, chlorine, etc., to produce the corresponding nitrostilbene naphthotriazole. The nitro group of the product is reduced in conventional fashion to obtain the corresponding amino triazole compound. The resulting amino compound is diazotized and coupled with an amine of the benzene series capable of coupling in the para position to the amino group. The resulting p-aminoazo dyestuff obtained is diazotized and coupled as previously described with a second molecule of an ortho-coupling aminonaphthalene sulfonic acid to give an o-aminoazo compound, which is oxidized to form the second naphthotriazole ring.

Alternatively, a different sequence of the foregoing reactions may be used, i.e., the diazotized 4-amino-4'-nitrostilbene disulfonic acid is coupled into the amine of the benzene series, the aminoazo product is diazotized and coupled into the aminonaphthalene sulfonic acid, the resulting o-aminoazo product is oxidized, the nitro group of the triazole compound is reduced to the amino group, the amino group is diazotized and the diazotized product is coupled to another molecule of aminonaphthalene sulfonic acid, and the resulting product is oxidized to the product dyestuff.

In preparing the preferred compounds of this invention, if an aminonaphthalene monosulfonic acid is employed in the formation of the first naphthotriazole group, an aminonaphthalene disulfonic acid is used in the preparation of the second naphthotriazole group and vice versa. Less preferably, both the first and second naphthotriazole groups are prepared from aminonaphthalene disulfonic acids.

Typical ortho-coupling aminonaphthalene sulfonic acids which may be used to form the naphthotriazole groups of the new dyestuffs include:

Monosulfonic acids—
2-naphthylamine-5-sulfonic acid
2-naphthylamine-6-sulfonic acid
2-naphthylamine-7-sulfonic acid
1-naphthylamine-4-sulfonic acid
2-amino-5-methoxynaphthalene-7-sulfonic acid
2-amino-5-chloronapthalene-7-sulfonic acid Disulfonic acids—
2-naphthylamine-3,6-disulfonic acid
2-naphthylamine-5,6-disulfonic acid
2-naphthylamine-6,8-disulfonic acid Any primary amine of the benzene series capable of coupling in the position para to the amino group may be used in the preparation of the dyestuffs of the present invention. The following amines are mentioned as typical examples of this class of coupling components of which m-toluidine and cresidine are especially preferred:

aniline
m-toluidine
m-ethylaniline
2,5- and 3,5-dimethylaniline
m-amino-p-cresol, methyl ether ("cresidine")
m-amino-p-cresol ethyl ether
6-chloro-m-toluidine
6-chloro-3-ethylaniline The preparative reactions referred to above are generally known to those skilled in the art. In forming the naphthotriazole groups of the present novel dyestuffs, the coupling of the diazonium salt to the aminonaphthalene sulfonic acid is preferably carried out in moderately acid medium, since that favors formation of a purer coupling product. The formation of the naphthotriazole ring is then preferably effected by means of ammoniacal copper salts, e.g., ammoniacal copper sulfate. The reduction of the nitro group of the stilbene residue is preferably accomplished with aqueous sodium sulfide.

Coupling of the diazonium salt of the resulting amine with the para coupling amine of the benzene series is effected in weakly acidic medium. Conveniently, all diazotization reactions employed in the present procedure are performed in the well-known "inverse" manner, i.e., by adding an aqueous mixture of amine and sodium nitrite to aqueous mineral acid. If desired or convenient, the azo coupling intermediates formed in the course of the present procedure may be isolated in conventional fashion, e.g., by salting the reaction mixture and filtering, and washed with aqueous sodium chloride.

The novel dyestuffs of the present invention are economical to make and dye cotton and other cellulosic fibers in desirable bright yellow shades of excellent fastness to light and washing and are compatible with conventional resin after-treatments to impart crease resistance, etc. Because they have substantially no affinity for nylon 66, the dyestuffs of the invention are especially suitable for dyeing the cotton portion of nylon-cotton blends with little staining of the nylon fiber.

The following examples illustrate the present invention but it is to be understood that the invention is not to be limited by the specific details thereof and that changes can be made without departing from the spirit or scope of the invention. The temperatures are in degrees centigrade and the parts and percentages are by weight.

*Example 1*

A slurry of 219 parts of 4-amino-4'-nitrostilbene-2,2'-disulfonic acid (54.7%, 0.3 mole) in 900 parts of water at 50° is made alkaline to Brilliant Yellow paper by addition of 26.2 parts of 50° Bé. aqueous caustic soda and cooled to 25°. After addition of 60 parts of 30% aqueous sodium nitrite, the mass is charged over a period of ½ hour to a solution containing 113 parts of aqueous 20° Bé. hydrochloric acid and 225 parts of water maintained at 25°. After addition of 11.5 parts of 30% aqueous sodium nitrate the reaction mixture is agitated for one hour at 25° and about 0.5 part sulfamic acid is added to destroy excess nitrous acid. The diazo solution is charged over a 15 minute period to a slurry, at 25°, containing 109 parts (0.3 mole) of 2-naphthylamine-3,6-disulfonic acid, 750 parts of water and 25.5 parts of 50% aqueous caustic soda, made acid to Congo Red by addition of 17.4 parts of 20° Bé. aqueous hydrochloric acid. Over a period of 15 minutes, a solution of 105 parts of sodium acetate in 300 parts of water is charged. The mixture is agitated for 16 hours without temperature control, and then heated to 90–95°. A solution of 132 parts of copper sulfate pentahydrate in 525 parts of water and 181 parts of 27% aqueous ammonium hydroxide is added to the coupled mass over a period of 10 minutes and the mixture is agitated at 95° for one hour. The mixture is cooled to 75° and 108 parts of 60% aqueous sulfide dissolved in 250 parts of water are added over a period of ½ hour. The mixture is agitated at 70–75° for 45 minutes. The mass is made acid to Congo Red by addition of 279 parts of 20° Bé. aqueous hydrochloric acid. Sodium chloride (540 parts) is charged, the mixture agitated and cooled to 50° and filtered. The filter cake is washed with a solution of 540 parts of sodium chloride and 5.8 parts of 20° Bé. hydrochloric acid in 3600 parts of water, slurried in 2100 parts of water, made alkaline to Brilliant Yellow by addition of 32.2 parts of 50° Bé. aqueous caustic soda and heated to 75°. Activated carbon (11.5 parts, "Norite") 53 parts of diatomaceous silica (Filter-Cel), and 52 parts of 30% aqueous sodium nitrite are charged and the mass is filtered. The solid collected is washed with five 150 part portions of water. The combined washings and filtrate are added over a ½ hour period to a mixture of 104 parts of 20° Bé. aqueous hydrochloric acid, 300 parts water and sufficient ice (500 parts) to maintain the temperature below 25°. After addition of 15 parts of 30% aqueous sodium nitrite, the reaction mixture is agitated for one hour at 25° and 0.5 part of sulfamic acid is charged to destroy excess nitrous acid.

To the diazotized mass is added a solution of 30.75 parts of m-toluidine in 290 parts of water and 39 parts of 20° Bé. aqueous hydrochloric acid. A solution of 122 parts of sodium acetate in 400 parts of water is added over a ½ hour period, the reaction mixture is agitated for 16 hours without temperature control, and filtered. The filter cake is washed with a solution containing 250 parts sodium chloride and 4.6 parts of 20° Bé. aqueous hydrochloric acid in 2500 parts of water. The filter cake is slurried in 2500 parts of water and the slurry is made alkaline to Brilliant Yellow by addition of 24.8 parts of 50° Bé. aqueous caustic soda. After addition of 45 parts of 30% aqueous sodium nitrite, the slurry is added over a ½ hour period to a solution containing 118 parts of 20° Bé. aqueous hydrochloric acid in 600 parts of water, which is maintained at 25–30°. After addition of 15 parts of 30% aqueous sodium nitrite, the diazotization mixture is agitated for four hours at 25–30° and 0.5 part of sulfamic acid is charged to remove excess nitrous acid. Over a 10 minute period, a mixture, at 30°, which had been prepared by agitating 63.2 parts of 2-naphthylamine-6-sulfonic acid in 600 parts of water at 60°, is charged to the diazo solution. A solution of 72 parts of sodium acetate in 200 parts of water is added over a ½ hour period, and the mixture is agitated for 16 hours without temperature control. The mixture is heated to 75°, charged with 250 parts of sodium chloride, and cooled to 30° and filtered. The filter cake is washed with a solution of 250 parts of sodium chloride and 4.6 parts of 20° Bé. aqueous hydrochloric acid in 2500 parts of water, agitated in 5000 parts of water, made alkaline to Brilliant Yellow by addition of 36 parts of sodium carbonate, heated to 90–95°. A solution of 113 parts of copper sulfate pentahydrate, 480 parts of water and 149 parts of 27% aqueous ammonium hydroxide is added over a 10 minute period and the reaction mixture is agitated for 1½ hours at 90–95°. Activated carbon (12 parts, "Norite") and diatomaceous silica (45 parts Filter-Cel) are added and the mixture is filtered. The filter cake is washed with 1500 parts of water at 60° and the wash liquor is combined with the filtrate. The liquid mixture is heated to 85° and 300 parts of sodium chloride are charged. The mass is agitated and cooled to 40°. After addition of 22.3 parts of 27% aqueous ammonium hydroxide, the mixture is agitated for 10 minutes and filtered at 40°. The filter cake is washed with a solution of 300 parts of sodium chloride in 3000 parts of water, and dried at 80–85°.

The product, thus obtained (250 parts), has the following formula in which the free acid form is shown:

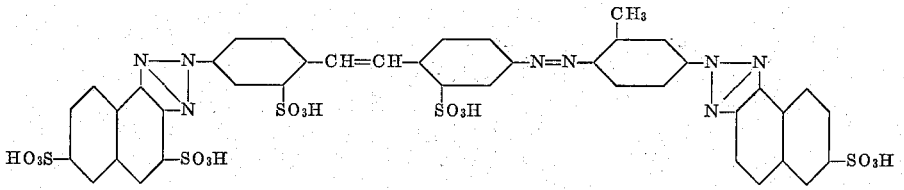

It dyes cotton in bright yellow shades which are equal in strength, brightness, wash fastness and slightly superior in light fastness to cotton dyeings obtained from the dyestuff of U.S.P. 2,232,078 (Example 3). The product stains nylon to a much lower extent than the above-mentioned dye of the prior art.

*Examples 2–19*

The procedure of Example 1 above is followed in preparing several other similar dyestuffs which like that of Example 1 give bright yellow dyeings on cotton. These dyestuffs likewise stained nylon 66 to a much lower degree than the dyestuff of U.S. Patent 2,232,078. The structure of these additional dyestuffs is indicated in the following table:

I claim:
1. A monoazo dyestuff of the general formula

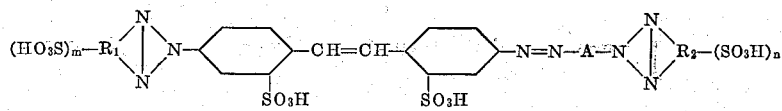

wherein $R_1$ and $R_2$ are 1,2-naphthylene radicals, A is an unsulfonated radical of the benzene series, the nitrogens attached to A being in para-position to each other, $n$ and $m$ are integers selected from the group consisting of 1 and 2, at least one of $n$ and $m$ being 2 and wherein $R_1$, $R_2$ and A may be further substituted by lower alkyl, lower alkoxy or chlorine substituents.

2. A monoazo dyestuff as described in claim 1 wherein the radical A has the formula

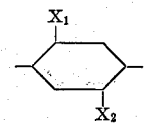

wherein $X_1$ is a lower hydrocarbon alkyl group and $X_2$ is selected from the group consisting of hydrogen, lower alkyl and lower alkoxy.

3. A monoazo dyestuff as described in claim 2 wherein $X_2$ is hydrogen.

4. A monoazo dyestuff as described in claim 2 wherein $X_1$ is methyl.

5. A monoazo dyestuff as described in claim 2 wherein $X_1$ is methyl and $X_2$ is methoxy.

6. A monoazo dyestuff as described in claim 1 wherein $m$ is 2.

7. A monoazo dyestuff as described in claim 1 wherein $m$ is 1.

TABLE

General Formula of Dyestuffs:

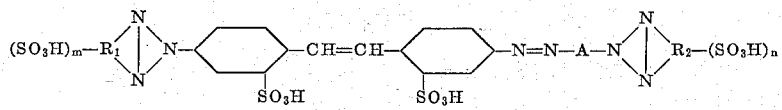

| Ex. | Radical $R_1(SO_3H)_m$, derived from— | Radical A, derived from— | Radical $R_2(SO_3H)_n$, derived from— |
| --- | --- | --- | --- |
| 2 | 2-naphthylamine-3,6-disulfonic acid | Meta-toluidine | 2-naphthylamine-5-sulfonic acid. |
| 3 | ----do---- | ----do---- | 2-naphthylamine-5,7-disulfonic acid. |
| 4 | ----do---- | Cresidine | 2-naphthylamine-6-sulfonic acid. |
| 5 | ----do---- | 50% cresidine, 50% m-toluidine | Do. |
| 6 | ----do---- | Cresidine | 2-naphthylamine-5-sulfonic acid. |
| 7 | 2-naphthylamine-5-sulfonic acid* | m-Toluidine | 2-naphthylamine-5,7-disulfonic acid. |
| 8 | 2-naphthylamine-3,6-disulfonic acid | Cresidine | Do. |
| 9 | 2-naphthylamine-5,7-disulfonic acid | m-Toluidine | 2-naphthylamine-5-sulfonic acid. |
| 10 | ----do---- | ----do---- | 2-naphthylamine-6-sulfonic acid. |
| 11 | ----do---- | ----do---- | 2-naphthylamine-5,7-disulfonic acid. |
| 12 | ----do---- | Cresidine | 2-naphthylamine-5-sulfonic acid. |
| 13 | ----do---- | ----do---- | 2-naphthylamine-6-sulfonic acid. |
| 14 | ----do---- | ----do---- | 2-naphthylamine-5,7-disulfonic acid. |
| 15 | 2-naphthylamine-6-sulfonic acid | m-Toluidine | 2-naphthylamine-3,6-disulfonic acid. |
| 16 | ----do---- | ----do---- | 2-naphthylamine-5,7-disulfonic acid. |
| 17 | ----do---- | Cresidine | 2-naphthylamine-3,6-disulfonic acid. |
| 18 | ----do---- | ----do---- | 2-naphthylamine-5,7-disulfonic acid. |
| 19 | 5-methoxy-2-naphthylamine-7-sulfonic acid | ----do---- | 2-naphthylamine-3,6-disulfonic acid. |

*The preparation of this dyestuff is carried out using the reactions of Example 1 in different sequence, i.e. diazotization and coupling of 4-amino-4'-nitrostilbene-2,2'-disulfonic acid to m-toluidine, diazotization and coupling of the resulting azo compound to 2-naphthylamine-5,7-disulfonic acid, triazole formation, reduction of the nitro group of the stilbene residue, diazotization and coupling of the amine product to 2-naphthylamine-5-sulfonic acid, and triazole formation.

8. The monoazo dyestuff of the formula
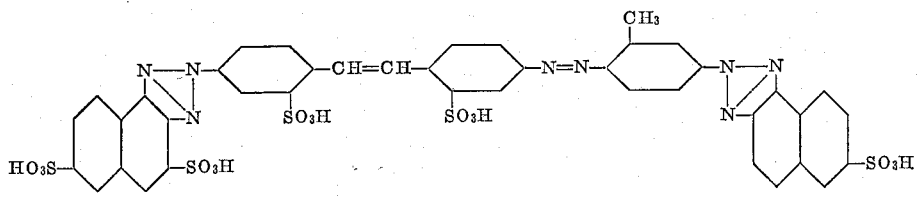
9. The monoazo dyestuff of the formula
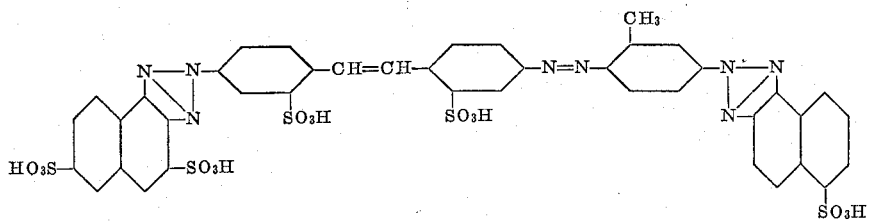
10. The monoazo dyestuff of the formula
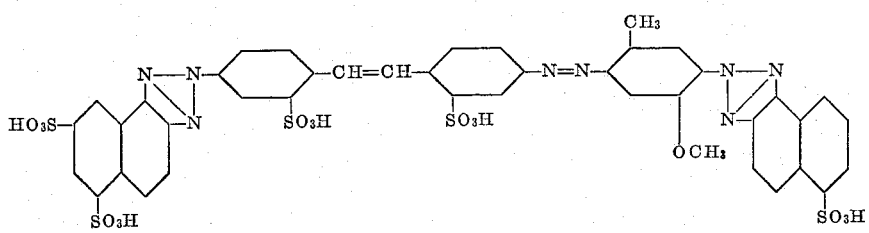
11. The monoazo dyestuff of the formula
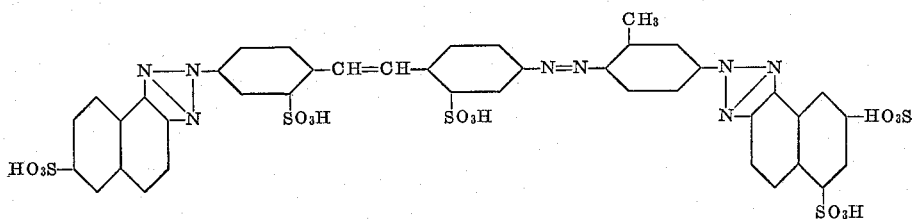
References Cited by the Examiner
UNITED STATES PATENTS
2,232,078   2/1941   Schindhelm _____ 260—157
CHARLES B. PARKER, *Primary Examiner.*
R. J. FINNEGAN, D. M. PAPUGA, *Assistant Examiners.*